UNITED STATES PATENT OFFICE.

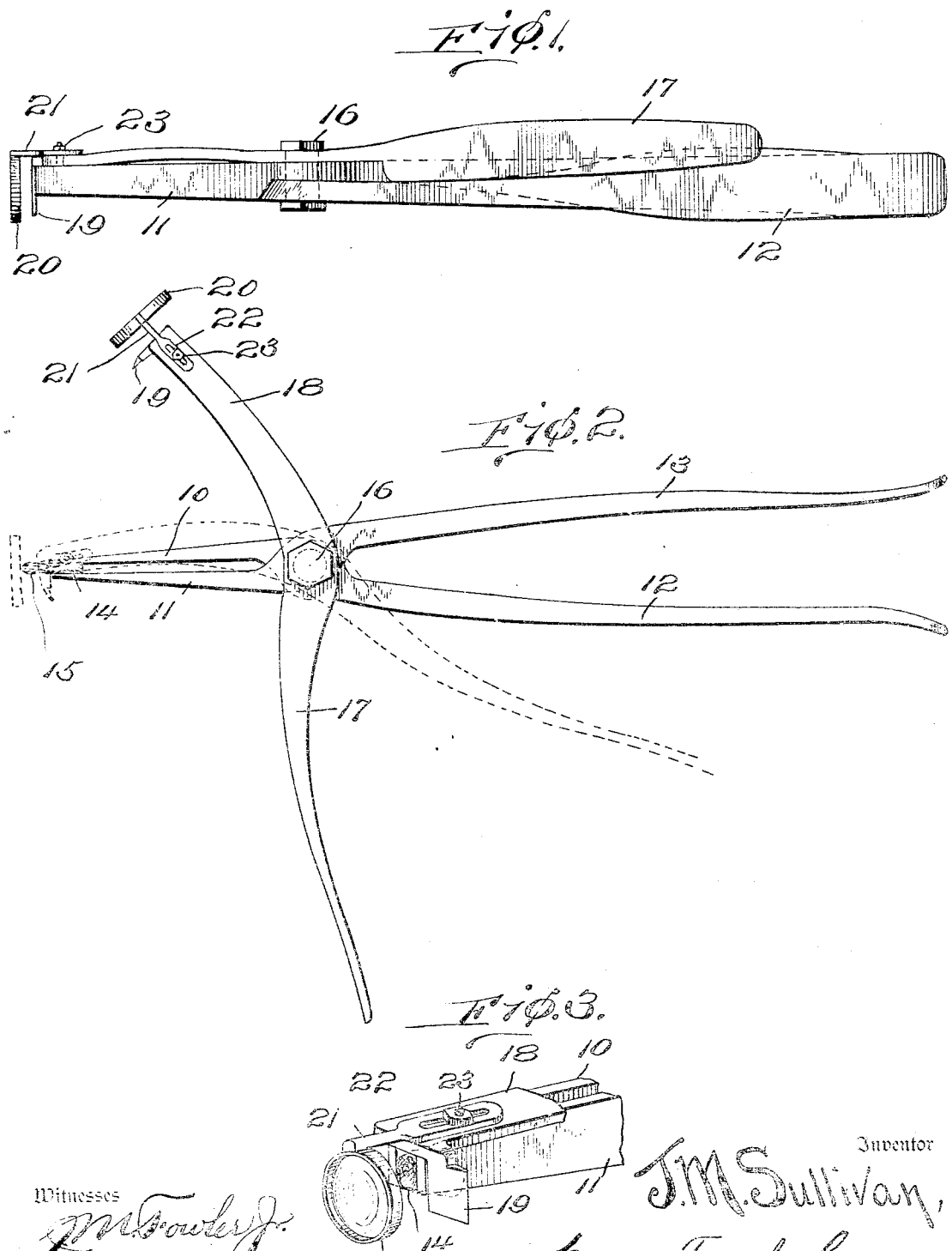

JAMES M. SULLIVAN, OF NORFOLK, NEBRASKA.

SEED-CORN TESTER.

1,056,307.

Specification of Letters Patent.

Patented Mar. 18, 1913.

Application filed March 26, 1912. Serial No. 686,631.

*To all whom it may concern:*

Be it known that I, JAMES M. SULLIVAN, a citizen of the United States, residing at Norfolk, in the county of Madison and State of Nebraska, have invented certain new and useful Improvements in Seed-Corn Testers; and I do hereby declare the following to be a full, clear, and exact description of the invention, such as will enable others skilled in the art to which it appertains to make and use the same.

This invention relates to seed corn testers and has for an object to provide an implement adapted to remove a kernel of corn from an ear, hold such kernel in the position in which it is removed, and automatically clip the extremity from the germ and simultaneously with such clipping bring a magnifying glass into position and focus with the clipped end for examination of the cut surface.

A further object of the invention is to provide a tweezer-like implement having slim, attenuated fingers proportioned to slip between adjacent kernels of corn upon a cob and to grasp one kernel between such fingers and to remove the kernel from the cob with the germ end extending beyond the extremities of the tweezer fingers while a third arm pivoted concentrically with the tweezer fingers carries a knife adapted to clip the extended germ end of the kernel and carrying a magnifying glass which is brought into proper focus with such clipping.

With these and other objects in view the invention comprises certain novel constructions, combinations and arrangement of parts as will be hereinafter more fully described and claimed.

In the drawings:—Figure 1 is a view of the improved implement in edge elevation. Fig. 2 is a view of the implement in side elevation with the tweezers closed upon a kernel of corn and the clipper-carrying arm open. Fig. 3 is a perspective view of the extremities of the several arms closed showing a kernel of corn clipped.

Like characters of reference indicate corresponding parts throughout the several views.

The improved apparatus which forms the subject matter of this application comprises the pair of tweezer fingers 10 and 11 respectively mounted upon crossed handle members 12 and 13, such tweezer fingers being slim and tapered as shown particularly in Fig. 2, and adapted to slip easily between adjacent kernels of corn as they appear upon a cob and to grasp a single kernel as shown at 14 in Fig. 2 to remove such kernel of corn from the cob with the germ end 15 extending beyond the extremities of such fingers 10 and 11.

Pivoted to the pivot 16 is a third arm 17 carrying a jaw member 18 which is provided with a knife 19 positioned and proportioned to pass closely across the ends of the fingers 10 and 11 and to clip the extended germ end of the kernel which extends beyond such extremities.

Secured to the jaw member 18 is a microscope 20 carried upon a rod 21 and slidably adjusted by means of a slot 22 and bolt 23 by which the focal distance of the microscope 20 from the clipped end of the kernel 14 may be varied as the vision of the user may make necessary.

It will be apparent that in use the kernel is withdrawn from the ear as above described by engaging such kernel with the fingers 10 and 11 and that after withdrawing from the cob the extended end is clipped by closing the jaw member 18 to the position shown in dotted lines in Fig. 2 and in full lines in Fig. 3 which brings the microscope 20 directly above the clipped end of the kernel and by means of which the operator may instantly make a microscopic examination of such clipped kernel. By the use of such apparatus kernels of corn from ears under examination may be removed, clipped and examined with great rapidity, accuracy and convenience.

I claim:—

1. In a seed corn testing apparatus, tweezer fingers adapted to be inserted between adjacent kernels of corn and to grasp a single kernel with the germ end extending beyond the tweezer extremities, and a member provided with a knife adapted to move in a path passing the extremity of the fingers and carrying a microscope located above the extremities when the member is closed.

2. In a seed corn testing apparatus, pivoted tweezer fingers proportioned to be inserted between adjacent kernels of corn and to grasp a single kernel with the germ end extending beyond the finger extremities and a third pivoted jaw provided with a knife positioned to pass across the extremities of the tweezer fingers and carrying a microscope positioned to be located directly above the extremities of the fingers when the third jaw is closed.

5. In a seed corn testing apparatus, means to grasp a single kernel of corn and withdraw it from a cob, means to clip the germ extremity from the grasped kernel, and means to simultaneously locate a magnifying member in position for examining the clipped surface of the kernel.

In testimony whereof I affix my signature in presence of two witnesses.

JAMES M. SULLIVAN.

Witnesses:
   F. W. STEINKRAUS,
   R. C. MARQUARDT.